(12) United States Patent
Modrek-Najafabadi

(10) Patent No.: US 7,955,534 B1
(45) Date of Patent: Jun. 7, 2011

(54) MONOLITHIC SUBSTRATE OF MATERIALS CONTAINING MULTIPLE OPENED CHANNELS OF ONE DIMENSIONAL MACROPORE HAVING A MESOPOROUS INNER SURFACE EXTENDING THROUGH THE SUBSTRATE AND A METHOD OF MAKING THE SAME

(75) Inventor: Bijan Modrek-Najafabadi, San Pedro, CA (US)

(73) Assignee: Nuvo Lite Technology, Inc., Santa Monica, CA (US)

( * ) Notice: Subject to any disclaimer, the term of this patent is extended or adjusted under 35 U.S.C. 154(b) by 813 days.

(21) Appl. No.: 11/820,241

(22) Filed: Jun. 19, 2007

(51) Int. Cl.
*B29C 65/00* (2006.01)
(52) U.S. Cl. .......................................... 264/44; 423/338
(58) Field of Classification Search .................. 264/42, 264/43, 44, 29.1; 423/338
See application file for complete search history.

(56) References Cited

U.S. PATENT DOCUMENTS

| | | | | |
|---|---|---|---|---|
| 4,070,514 | A | * | 1/1978 | Eatherly et al. ............. 428/64.1 |
| 6,207,098 | B1 | * | 3/2001 | Nakanishi et al. ............ 264/414 |
| 6,541,539 | B1 | | 4/2003 | Yang |
| 2004/0091411 | A1 | * | 5/2004 | Modrek-Najafabadi ...... 423/338 |

OTHER PUBLICATIONS

Jiang, Template-Directed Preparation of Macroporous Polymers with Oriented and Crystalline arrays of Voids, J.Am. Chem So. 1999, 121.
Pine, D.J., Ordered Macroporous material by Emulsion, Nature, Vo. 389, 1997.
Pine, D.J., "Uniform Macroporous Ceramics and Plastics by Emulsion Templating", Adv. Mater. 1998.
Colvin, "Preparation of Macroporous Metal Films . . . " J.Am. Chem Soc. 1999, 121.
Qi, K., "synthesis of 3-D Ordered Macroporous Silicate Using the Template . . . ", Chinese Science Bull. 2000, vol. 45, No. 11.
Hsieh, S., "Preparation and Evaluation of Slurry-Packed Liquid Chromatography Microcolumns . . . ", Anal. Chem. 1996.
Fan, H. Seslf-assembled Aerogel-like Low Dielectric . . . 285 (2001), 79-83.
Kim, J., "Structural Design of Mesoporous Silica . . . " J. Phys. Chem. B 2002.
Choi, D., "Effect of two-step sol-gel reaction . . . " Jrnl. of Colloid and Interface Science, 261 (2003).
Zhao, D., "Triblock Copolymer Synthesis . . . " Science, vol. 279, Jan. 23, 1998.

* cited by examiner

*Primary Examiner* — Christina Johnson
*Assistant Examiner* — Galen Hauth
(74) *Attorney, Agent, or Firm* — Thomas I. Rozsa

(57) ABSTRACT

A monolithic substrate of materials containing within it multiple opened channels of one dimensional macropore have a mesoporous inner surface and a method for making the same, wherein each of the opened channels is isolated from each other. The isolated channels of the one dimensional pore are aligned with and continuously extend through the entire substrate which contains various mesopores in three dimensions. The macropore has preferred pore sizes ranging from about 0.1 micrometers to about 20 micrometers, and the mesopore has a preferred pore size which is less than 500 angstrom.

32 Claims, 4 Drawing Sheets

MONOLITHIC SUBSTRATE OF MATERIALS CONTAINING MULTIPLE OPENED CHANNELS OF ONE DIMENSIONAL MACROPORE HAVING A MESOPOROUS INNER SURFACE EXTENDING THROUGH THE SUBSTRATE AND A METHOD OF MAKING THE SAME

BACKGROUND OF THE INVENTION

1. Field of the Invention

The present invention is related to porous materials, and more particularly related to a monolithic substrate of materials containing a multiplicity of opened channels of one dimensional macropore having a mesoporous inner surface.

2. Description of the Prior Art

Porous materials containing meso and macro pores and methods for making the materials are known. The following 14 references including patents, published patent applications and publications are the closest prior art references which are related to the present invention.

1. Jiang, et al., "Template-Directed Preparation of Macroporous Polymers with Oriented and Crystalline arrays of Voids", J. Am. Chem. Soc. 1999, 121, 11630-11637 (hereafter "the Jiang Publication");
2. Pine, D. J. And Imhof, A., "Ordered Macroporous materials by Emulsion Templating", Nature, Vol. 389, 1997, 121, 948-951 (hereafter "the Pine Publication");
3. U.S. Pat. No. 6,207,098 issued on Mar. 27, 2001 to Nakanishi et al. for "Method for Producing Porous Inorganic materials" (hereafter "the 'Nakanishi Patent");
4. Pine, D. J. And Imhof, A., "Uniform Macroporous Ceramics and Plastics by Emulsion Templating", Adv. Mater. 1998, 10, No. 9, 697-700 (hereafter "Imhof Publication");
5. Colvin, et al., "Preparation of Macroporous Metal Films from Colloidal Crystals", J. Am. Chem. Soc. 1999, 121, 7957-7958 (hereafter "the Colvin Publication");
6. Qi, Kai, et al., "Synthesis of 3-D Ordered Macroporous Silicate Using the Template Formed from Monodispersed Polystyrene Latex", Chinese Science Bulletin, 2000, Vol. 45, No. 11, P. 992-994 (hereafter "the Qi Publication");
7. Hsieh, S., and Jorgenson, J., "Preparation and Evaluation of Slurry-Packed Liquid Chromatography Microcolumns with Inner Diamethers from 12 to 33 μm", Anal. Chem. 1996, 68, 1212-12-17 (hereafter "the Hsieh Publication");
8. United States Patent Application Publication to Kumakhov, et al. for "Polycapillary Chromatographic Column and method of Its Manufacturing" (hereafter "the Kumakov Patent Application");
9. U.S. Pat. No. 6,541,539 issued on Apr. 1, 2003 to Yang, P. et al. for "Hierarchically Ordered Porous Oxides" (hereafter "the Yang Patent");
10. Fan, H. et al., "Self-assembled Aerogel-like Low Dielectric Constant Films", J. of Non-Crystalline Solids", 285 (2001), 79-83 (hereafter "the Fan Publication");
11. Brinker, J., Scherer, G., Sol-Gel Science, The Physics and Chemistry of Sol-Gel Process, Academic Press 1990 (hereafter "the Brinker Publication");
12. Kim, J., et al. "Structural Design of Mesoporous Silica by Micelle-Packing Control Using Blends of Amphiphilic Back Copolymers", J. Phys. Chem. B 2002, 106, 2552-2558 (hereafter "the Kim Publication");
13. Choi, D., et al. "Effect of two-step sol-gel reaction on the measoporpous silica structure", Journal of Colloid and Interface Science, 261 (2003)127-132 (hereafter "the Choi Publication"); and
14. Zhao, D., et al. "Triblock Copolymer Synthesis of Mesoporous Silica with Periodic 50 to 300 Angstrom Pores" (hereafter "the Zhao Publication").

The Jiang Publication discloses the preparation of macroporous polymer membranes with regular voids. These materials are made using a colloidal crystal template of silica, microspheres, wherein use of the silica microspheres as templates makes it possible to employ a chemical method instead of a thermal method for template removal. For this reason, polymers as diverse as polyurethane and polystyrene can be used to create free standing macroporous films having a well formed porous structure consisting of voids ranging in diameter from 200 to 400 nm. These large cavities are not isolated, but rather interconnected by a network of monodispersed smaller pores having a diameter between 50 to 130 nm.

The Pine Publication discloses a new method for producing highly monodispersed macroporous materials with pore size ranging from 50 nm to several micrometers. The method starts with an emulsion of equally sized droplets to form macroporous materials of titania, silica and zirconia, wherein the emulsion droplets are employed as templates around which material is deposited through a sol-gel process. Subsequent drying and heat treatment yields solid materials with spherical pores left behind by the emulsion droplets, wherein the pore sizes can be accurately controlled.

The Nakanishi Patent discloses a process for producing inorganic porous materials, mainly composed of glass or glass-ceramic components. The components have interconnected continuous three dimensional macropores with a median diameter larger than 0.1 um, and mesopores in the walls of said macropores, wherein the mesopores have a median diameter between 2 and 100 nm. The process can include dissolving a water-soluble polymer or some other pore forming agent and a precursor for a matrix dissolving agent in a medium for mixing with a metalorganic compound.

The Imhof Publication discloses a new method for producing macroporous materials with highly uniform pores in the range from 50 nm to 10 um. The technique can also produce materials of any desired porosity up to approximately 90%.

The Colvin Publication discloses a developed template-directed synthesis to the formation of porous metals. These metals are three-dimensional highly ordered, free standing macroporous metal films with interconnected spherical voids having sizes ranging from about 200 nm to about 400.

The Qi Publication discloses a modified fast sol-gel process, which is based on the template formed from monodispersed polystyrene latex. The process is used for synthesizing a three-dimensional ordered macroporous silica material after removing the template by calcination at high temperature, wherein the silica material contains highly ordered packed pores which are interconnected.

The Hsieh Publication discloses fused silica capillary liquid chromatographic columns with an inner diameter about 12 micrometers to about 33 micrometers. It discloses that there is a linear decrease of the eddy diffusion term as the column diameter decreases, wherein the decreased eddy diffusion term is the predominant fact for achieving a lower height of theoretical plates of the columns.

The Kumakhov Patent application discloses invented polycapillary chromatographic columns with channels having submicron cross-section sizes. The channels' number can be increased up to hundreds of thousands and more with corresponding substantial increase of efficiency, which is due to an increase in a total surface of the walls of the channels. However, the mesopores (if any) of the Kumakhov invention are expelled throughout the substrate which is in a softened condition. Therefore, the inner surface of the channels do not have mesoporous characteristics.

The Yang Patent discloses a low-cost and an efficient method of preparing hierarchically ordered structures by combining, concurrently or sequentially, micromolding, latex templating, and cooperative self-assembly of hydrolyzed inorganic species and amphiphilic block copolymers.

The Fan Publication discloses a process to obtain a series of new spin-on nanoporous silica films with controlled porosity and dielectric constants after evaporating induced self-assembly during spin-coating.

The Brinker Publication discloses the science of sol-gel techniques including processes to manufacture the sol-gel.

The Kim publication discloses formation of mesoporous silica materials using blends of diblock and Pluronic triblock amphiphilic block copolymers as the structure-directing agent and sodium silicate as the silica source.

The Choi Publication discloses the effect of a two-step sol-gel reaction by abrup pH change on the SBA-15 and mesocellular silica foams.

Finally, the Zhao Publication discloses an application of amphiphilic triblock copolymers to direct the organization of polymering silica species, which results in the preparation of well-ordered hexagonal mesoporous silica structure (SBA-15) with uniform pore size up to approximately 300 angstrom.

There is a significant need to provide a monolithic substrate of materials containing a multiplicity of open channels of one dimensional macropore having a mesoporous inner surface extending through the substrate to significantly improve application of the substrate including the application in modern column chromatography.

SUMMARY OF THE INVENTION

The present invention is related to materials having an interior monolithic substrate of materials containing multiple opened channels of one dimensional macropore having a mesoporous inner surface, and a method for making the same. Each of the opened channels is isolated from each other. The isolated channels of the one dimensional pore are aligned with and continuously extended through the entire substrate which contains various mesopores in three dimensions, wherein the macropore has preferred pore sizes ranging from about 0.1 micrometers to about 20 micrometers, and the mesopore has a preferred pore size which is between 20 to 500 angstroms. In addition, preferred materials for the present invention include polymers and inorganic materials such as ceramics.

The method for making the monolithic substrate of materials containing multiple opened channels of one dimensional macropore is combined with a well known Sol-Gel technique with a novel process for the addition of the multiple opened channels of one dimensional macropore which are positioned inside and extended through the entire substrate, wherein the combination of the Sol-Gel techniques which is combined with the process for adding internal channels defines the method of the present invention.

Specifically, the method of the present invention consists of the following steps:

(a) Providing a metal compound or a mixture of metal compounds, containing a metal constituent which is the precursor of a metal constituent of the materials, and non-metallic constituents including organic constituents having at least one hydrolyzable group;

(b) Hydrolyzing the metal compound or the mixture of the metal compounds for preparing a sol;

(c) Modifying the sol by mixing the sol with a matrix pore modifier to make a modified sol;

(d) Preparing a model of the monolithic substrate comprising a hollow housing having a first and second end, wherein the housing has a removable first and second stop for sealing the respective first and second end of the housing and the inside of the housing contains a multiplicity of micro fibers which are aligned with an elongated dimension of the housing, (e) Casting the modified sol into the model of the monolithic substrate of materials to form a cast modified sol, wherein the cast modified sol surrounds each of the microfibers;

(f) Gelling the cast modified sol inside of the model to form a gel;

(g) Aging the gel to be a syneresical gel;

(h) Drying the syneresical gel to be a monolithic substrate of a dried and solidified gel which contains the multiple micro fibers within it;

(I) Removing the monolithic substrate of the dried and solidified gel from the housing, wherein the dried and solidified gel surrounds each of the multiple micro fibers;

(j) Forming a monolithic substrate of ceramic materials by heating the monolithic substrate of the dried and solidified gel, wherein the inside micro fibers are eliminated to form respective inside multiple channels of one dimensional macropore having a mesoporous inner surface. An additional chemical treatment is required to eliminate the inside microfibers if the fibers are inorganic.

It will be appreciated that it is within the spirit and scope of the present invention, for step c of the method can be eliminated. Instead of step c, the method can include applying the matrix pore modifier for producing mesopores of the final product materials. An additional process can be applied of adding a solution having a basic pH to the get which is formed at the step. f, wherein through exchanging a solvent of the gel when the gel is at a wet state, a skeleton of the gel structure can be changed, thereby changing the mesopores of the final materials.

Porous materials particularly for materials containing bimodal mesopores and macropores are useful for various applications, including applications in chemical catalysts, molecular separation devices including chromatographic columns, sorbent medium, thermal and acoustic devices, electrical insulators, and optical devices. It will be appreciated that in the field of sol-gel science and engineering which employs methods including a template-directed or matrix modifying methodologies, a number of new porous materials have been achieved, such as those of the Nakanishi Patent, and publications from Imhof, Siorg and Kai, wherein the macropores are interconnected in three dimensions inside of the porous materials. However, such porous three dimensional interconnected channel materials do not have the advantage of materials having multiple isolated one dimensional channels in column chromatography. It is because the eddy diffusion is significantly decreased in columns which are constructed using the materials having the one dimensional channels, so that a lower height of the theoretical plates can be achieved.

Therefore, as a contrast, it is significantly advantageous particularly for the column manufacturing to have a substrate of materials comprising a multiplicity of opened channels of one dimensional macropores having an inner mesoporous surface, wherein each one of the channels having roughly the same size internal diameter are isolated from each other. The isolated channels are aligned with and further extended in one dimension throughout the entire substrate of the materials. In addition, the substrate of materials contains various mesopores which are uniformly distributed in three dimensions within the substrate, so that the one dimensional macropore contains the mesoporous inner surface.

Therefore, applying the mesoporous substrate of materials containing multiple opened channels of one dimensional macropore, the manufactured microcapillary columns can achieve results including a high resolution and efficiency to separate analytes in the chromatographic application. The results are achieved from mechanisms that each one dimensional macropore having the inner mesoporous surface inside of the microcapillary column restricts the eddy diffusion of the analytes which are positioned inside of the microchannels of the one dimensional macropore. In addition, applying the present invention substrate of the materials in column manufacturing, a lower liquid pressure can be achieved for the liquid chromatography, as compared with a higher liquid pressure which is required for the conventional packed columns, since each channel of one dimensional macropore has a lower resistance for a liquid flow in the liquid chromatography.

It is therefore an object of the present invention to provide a mesoporous monolithic substrate of materials containing multiple opened channels of one dimensional macropore having a mesoporous inner surface which is manufactured with the present invention method, so that the substrate of the materials can be used to manufacture columns, wherein each column is comprised of multiple microchannels for achieving a high resolution and efficiency to separate analytes, in addition to a low liquid pressure of the liquid chromatography.

It is another object of the present invention to provide a monolithic substrate of materials containing multiple opened channels of one dimensional macropore having a mesoporous inner surface which is manufactured with the present invention method, so that the substrate of the materials can be used to manufacture various products including porous filters, catalysts, solid phase supports, materials for solid phase extraction, sorbent medium, thermal and acoustic devices, electrical insulators, and optical devices, particularly if the channels are arranged orderly.

It is also an object of the present invention to provide a method for manufacturing the monolithic substrate of materials containing multiple channels of one dimensional macropore having a mesoporous inner surface, wherein the method is combined well known Sol-Gel techniques with a novel process for addition of the multiple channels of one dimensional macropore which are positioned inside and extend through the entire substrate, so that the combination of the Sol-Gel techniques which is combined with the process for adding internal channels defines the method of the present invention.

It is an additional object of the present invention to provide a novel step of casting the sol into a model comprising a hollow housing having a first and second end, wherein the housing inside contains a multiplicity of micro fibers which are aligned with an elongated dimension of the housing, and the model has a removable first and second stop for sealing the respective first and second end of the housing, so that a volume which is occupied by each of the multiple microfibers is the precursor of one of the multiple channels of one dimensional macropore in the substrate of the materials after the microfiber is removed.

It is a further object of the present invention to provide a step for eliminating the microfibers which is positioned inside of a precursor of the final product substrate of the materials by heating the precursor if the microfibers are organic, or from chemical treatment if the microfibers are inorganic, so that it forms the final product of the substrate of the materials containing a multiplicity of opened channels of one dimensional macropore having a mesoporous inner surface.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated:

FIG. 1 series containing FIGS. 1A, 1B, 1C and 1D schematically illustrates a novel process to make a multiplicity of opened channels of one dimensional macropore from the present invention, wherein

DETAILED DESCRIPTION OF THE PREFERRED EMBODIMENTS

Figure 1A:
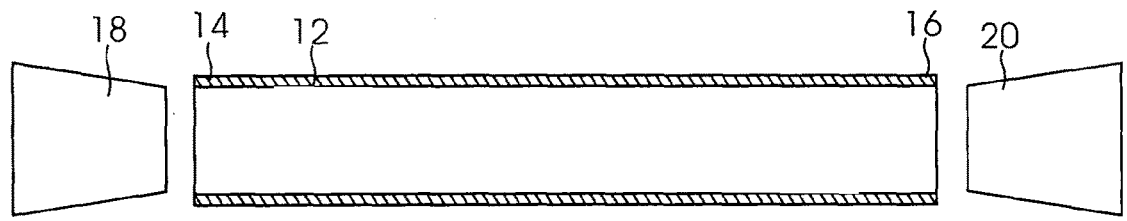
FIG. 1A illustrates preparing a housing for the substrate.

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

The present invention is a monolithic substrate of materials inside containing multiple opened channels of one dimensional macropore have a mesoporous inner surface and a method for making the same, wherein each of the opened channels is isolated from each other. The isolated channels of the one dimensional pores are aligned with and continuously extended through the entire substrate which contains various mesopores in three dimensions. The macropore has preferred pore sizes ranging from about 0.1 micrometers to about 20 micrometers, and the mesopore has a preferred pore size which is less than 500 angstrom. In addition, the preferred materials include polymers and ceramics.

The method of the present invention is combined well known Sol-Gel techniques with an additional novel step for the addition of multiple opened channels of one dimensional macropore which are positioned inside and extended through the entire substrate. The novel step is comprised of positioning a multiplicity of microfibers inside of a precursor of the substrate and eliminating the microfibers before forming the substrate of the present invention.

The present invention of a mesoporous monolithic substrate of materials inside containing multiple channels of one dimensional macropores having a mesoporous inner surface has many applications, including the applications for column chromatography, porous filters, catalysts, solid phase supports, materials for solid phase extraction, sorbent medium, thermal and acoustic devices, electrical insulators, and optical devices.

The present invention method for producing a porous monolithic substrate of materials specifically consists of the following steps:

(a) providing a metal compound containing a metal constituent and non-metallic constituents including organic constituents. The organic constituents of the metal compound consists of at least one hydrolyzable functional group. The metal constituent of the metal compound has a metal element which is selected from a group consisting of carbon, silicon, zirconium, titanium, aluminum and germanium, wherein the metal constituent is a precursor of a metal constituent of the materials produced by the present invention method. Alkoxide and silicon compound are examples of the metal compounds which can be employed in the present invention. It will be appreciated that, within the organic constituents, there may be non-hydrolyzable functional groups. In addition, a mixture of different metal compounds is also appropriate, wherein each of the different metal compounds contains the same metal element, but contains different organic constituents. However, at least one hydrolyzable functional group is contained within each of the different organic constituents of the different metal compounds, which may further contain unhydrolyzable functional groups. Alkoxides are examples for the mixture of the different metal compounds.

(b) Hydrolyzing the metal compound or the mixture of different metal compounds to form a sol. It will be appreciated that during the step of hydrolyzation, a catalyst may be used to speed up the hydrolyzation, wherein the catalyst is a known art.

(c) Modifying the sol by mixing the sol with matrix pore modifiers to form a modified sol. The matrix pore modifiers consist of surfactants or a solution which can be further modified to be a basic pH. The preferred surfactant can be selected from a group consisting of triblock copolymers such as poly (ethylene oxide)-b-poly (propylene oxide)-b-poly (ethylene oxide) which is abbreviated as PEO-PPO-PEO, cetyltrimethyl ammonium bromide, hexadecyltrimethyl ammonium chloride, butadiene-b-ethylene oxide, organic chemicals containing amido group or alkylamido group, organic chemicals containing amide group including N-methylormamide, N,N-dimethylformamide, actamide and N-mettylacetamide, pyridine and imidazol. As to the solution having the basic pH of the matrix pore modifiers, urea is an example since it can be used to make the solution having the basic pH at elevated temperatures. It will be appreciated that application of the matrix pore modifiers modifies the mesoporous structure of the materials which are manufactured through the present invention method, so that desirable sizes of the mesopores can be achieved. In addition, with application of the modifiers, it helps to eliminate cracks of the materials during a step of drying gel in the present invention method.

Figure 1B:
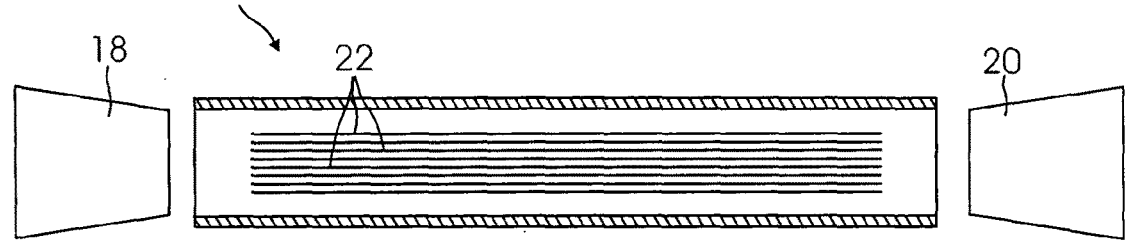
FIG. 1B illustrates placing a multiplicity of microfibers inside of the housing where the microfibers are positioned so as to be aligned with the longitudinal direction of the housing.
Figure 1C:
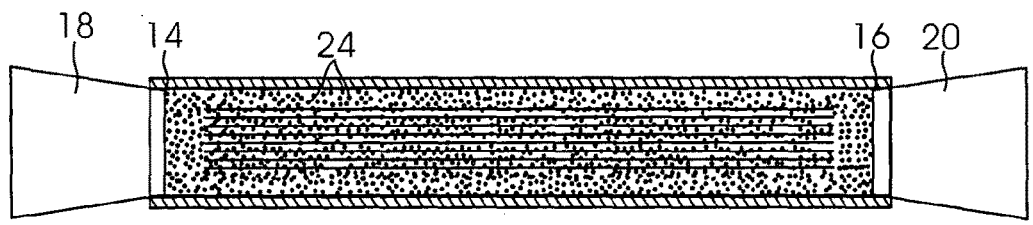
FIG. 1C illustrates a result after casting a modified sol into the housing.

(d) Referring to FIGS. 1A through 1D, casting the modified sol into inside of a model 10 to form a cast modified sol. The model 10 is illustrated in FIGS. 1A and 1B, which is comprised of a housing 12 and a multiplicity of micro fibers 22. The housing 12 such as a glass tube has a first end 14 and a second end 16, and a respective first stop 18 and second stop 20 for the purpose of sealing the respective ends of the housing. The multiple micro fibers 22 are placed inside of the glass tube 12, wherein each of the fibers 22 are positioned to be parallel to each other, and further aligned with a longitudinal direction of the glass tube 12. In a preferred embodiment, the microfibers are positioned orderly. As further illustrated, a length of the fibers 22 is shorter than the length of the glass tube 12, so that the position and condition of the fibers 22 which are kept inside of the glass tube 12 will not be affected after the first and second stop 18 and 20 are partially inserted into and subsequently seal the respective first and second end 14 and 16 of the housing glass tube 10. The preferred micro fibers 22 are either organic or inorganic having a diameter ranging from 0.1 µm to 20 µm, which micro fibers 22 can be eliminated through physical or chemical procedures. After casting the sol 24 into the model, each of the micro fibers 22 is isolated by the cast sol. It will be appreciated that the cast sol is a precursor for the final monolithic substrate of the materials.

(e) Gelling the cast modified sol inside of the mold to form a gel. The gelling process automatically happens after some time when the modified sol is made, wherein the times are called a gelling time. The gelling time is dependent upon various factors, including types of chemical or chemicals used, pH of the modified sol and temperature of the modified sol. Therefore, the gelling time can be objectively controlled by varying one or more factors to vary the gelling time.

It will be appreciated that, instead of modifying the sol in step (c) with the matrix pore modifiers including the surfactants and solution capable of producing the basic pH, which can result in changing the pore structural characteristics of the substrate including the pore sizes and pore size distribution, the modification of the pore structure of the substrate can be conducted at the gelling step after the gel is formed. In this situation, a solution having a basic pH is used to exchange a solvent of the sol when it is wet. It will be appreciated that, changing pH of the gel generally causes a change of characteristics of skeletons of the gel, to thereby change the pore structural characteristics of the substrate of materials.

(f) Aging the gel into an aged gel, wherein the aging process is accompanied with syneresis, which causes structural transformation of the gel. The structural transformation further results in change of properties including the mechanical property of the gel.

(g) Drying the aged gel to form a monolithic substrate of a dried and solidified gel which contains multiple macrofibers inside. The drying step is very crucial to the mechanical structure of a final product substrate of the materials, wherein fracture formation is the main concern for damaging of structure of the substrate of materials. Care should be taken to avoid formation of fracture within the aged gel. A preferred procedure for avoiding the structural feature is to control a rate of the drying process of the aged gel, wherein a low rate of the drying process can eliminate formation of the structural fracture. It will be appreciated that, after completion of the drying step, the dried gel is solidified to form a monolithic substrate, wherein the dried and solidified gel surrounds each fiber. The monolithic substrate is then taken out of the housing.

(h) Forming a monolithic substrate of ceramic materials containing a multiplicity of channels of one dimensional macro pore having a mesoporous inner surface by heating the monolithic substrate of the dried and solidified gel after eliminating the inside microfibers if they are organic since the organic fibers burned out during the heating process. It will be appreciated that the monolithic substrate of the dried and solidified gel containing the metal constituents are sintered into ceramic materials in the heating process, wherein temperature is applied up to about 400 degree C. to above 500 degree C. In a situation if inorganic micro fibers are applied in the step. d of casting, an additional step of chemical treatment is needed to remove the inorganic micro fibers which are positioned inside of the monolithic substrate of the ceramic materials. For example, if copper micro wires are used, a nitric acid will be used to chemically remove the copper micro-wires inside of the substrate of the materials, so that a multiplicity of channels of one dimensional pore can be achieved.

EXAMPLES

The following are examples and experimental information of the present invention sensor and method which are offered by way of illustration only and not by way of limitation.

Example 1

Acetic acid of 5 milliliter (ml) was diluted into 96 ml of distilled water, where the diluted acetic acid has a pH 4. The diluted acetic acid solution of 40 ml was thoroughly mixed by stirring with 60 ml of tetraethoxysilane to form a transparent liquid. Formation of the transparent liquid indicated a completion of hydrolysis of the tetraethoxysilane. Urea of 4.5 gram (g) was added in to the transparent liquid which is stirred, and the solution was kept to be stirred till the urea was completely dissolved. At this stage a modified sol was formed.

A casting mode was prepared according to illustration of FIG. 1B, where a multiplicity of organic fibers having a diameter about 12 micro meter were positioned inside of the housing 10. The organic fibers were purchased from Micrro Spun, Lion Brand Yarn Company, N.Y., NY USA and used without further treatment as they were received. Before casting the model, the first end of the housing was tightly sealed with a first rubber stop. The sol was then slowly cast into the model. After completion of casting the sol into the housing, the second end of the housing was also tightly sealed with a second rubber stop.

The sealed glass tube containing the sol and micro fibers was placed in an oven for gelling the sol to form a gel and subsequently aging the gel into an aged gel in three days, wherein the oven temperature was controlled at 60 degree C. During the time period of gelling, synersis of the gel was taking place. The oven temperature was then raised to 85 degree C. for three hours before removing the sealed glass tube out of the oven. After removing the rubber stops, the glass tube with opened first and second end was placed inside of the oven again for a drying process of the aged gel, wherein the oven temperature was controlled at 60 degree C.

Figure 1D:
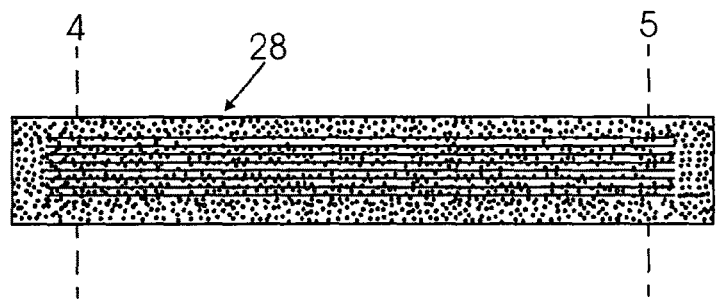
FIG. 1D illustrates formation of the product substrate of materials containing a multiplicity of channels of one dimensional macropore after cutting a first and second end of the uncut substrate, wherein the uncut substrate is previously removed from the housing.

After completion of the drying process, the aged gel which is placed inside of the housing is dried and solidified to form a monolithic substrate of a dried and solidified gel inside containing micro fibers. The formed monolithic substrate was easily taken out of the housing due to its reduced size after drying. The substrate was placed in a furnace, where the temperature of the furnace was gradually increased to 500 degree C. during the first two hours and kept the same temperature for additional four hours. The furnace temperature was then gradually decreased to a room temperature in about two hours. At this stage, the final product of the silica material is completed after transforming the monolithic substrate of the dried and solidified gel inside containing multiple microfibers into a monolithic substrate of ceramic materials containing multiple channels of one dimensional macropore having a mesoporous inner surface. Referring to FIG. 1D, after cutting a first end at the position 4 and a second end at a position 5 of the substrate of the silica ceramic material 28, the final product of the present invention was completed for a monolithic substrate of silica ceramic material inside containing a multiplicity of opened channels of one dimensional macropore having mesoporous inner surface.

A small section of the substrate was cut for a nitrogen adsorption test. The test demonstrated that a Brunauer Emmett Tewller (BET) surface area was 438 sq. m/g for the material.

Figure 2:
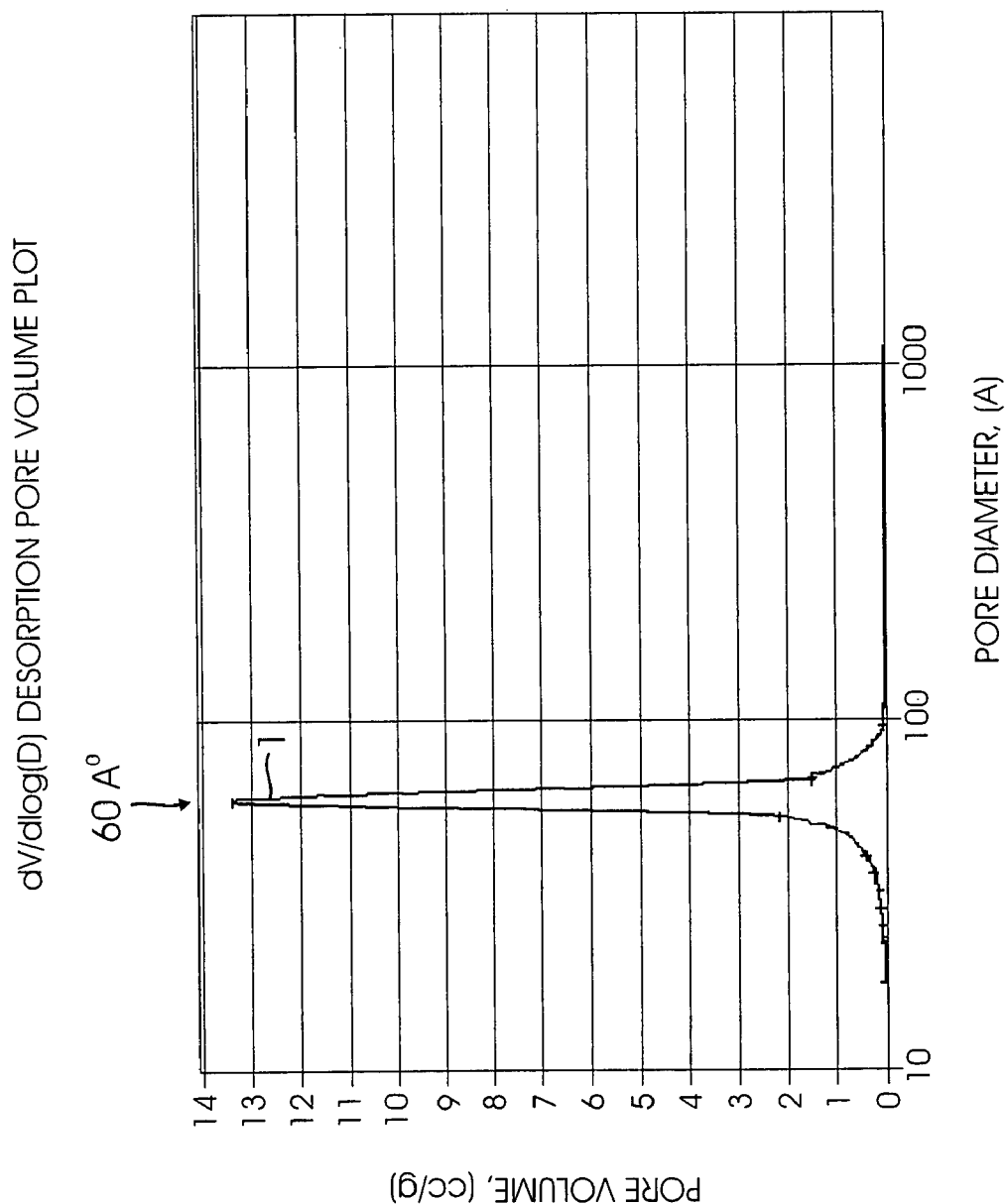
FIG. 2 is a graph containing a curve to illustrate a desorption pore volume versus the pore diameter of the mesopores from an example of the substrate of materials of the present invention.
Figure 4:
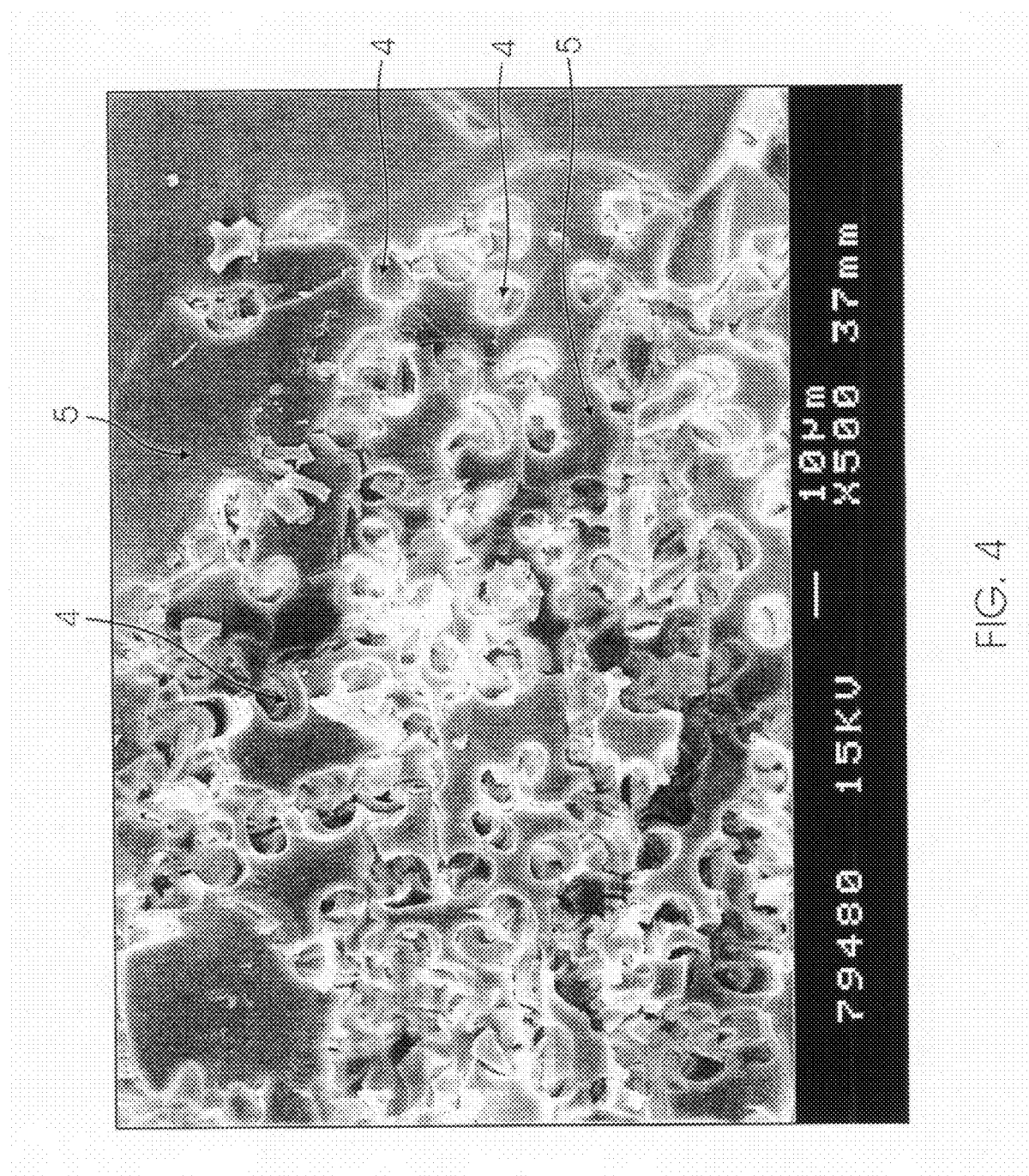
FIG. 4 is an image from the scanning electron microscopic analysis for the transverse cross section of the substrate of materials of the present invention, where the image is at 500 magnification.

In addition, a very sharp peak 1 is observed at approximately 60 angstrom corresponding to an average pore size diameter of 73.4 angstrom, which is illustrated in FIG. 2. The result of the very sharp peak demonstrates a narrow size distribution of the mesopores, which have an average pore size of 73.4 angstrom. Additional tests from Scanning Electron Microscopy (SEM) on a cross section of the substrate indicates that a consistent pore size of about 8 micrometer for the one dimensional macropore 4, which appears as a round object when the substrate 5 in FIG. 4 of a SEM image. The substrate 5 appears as a solid dark object on the SEM image.

Example 2

The same procedure was employed in Example 2, wherein the procedure was illustrated in Example 1. However, the only difference in the Example 2 was to add 3.5 g urea and 4 g P123 into tetraethoxysilane in the step. b of the procedure, as compared with only the addition of the urea in the Example 1. In addition, the P123 which was used has a specific structural constituent as $PEO_{20}PPO_{70}PEO_{20}$. A small section of the substrate is cut for a nitrogen absorption test, which demonstrates that a Brunauer Emmett Tewller (BET) surface area was 350 sq. m/g for the material.

Figure 3:
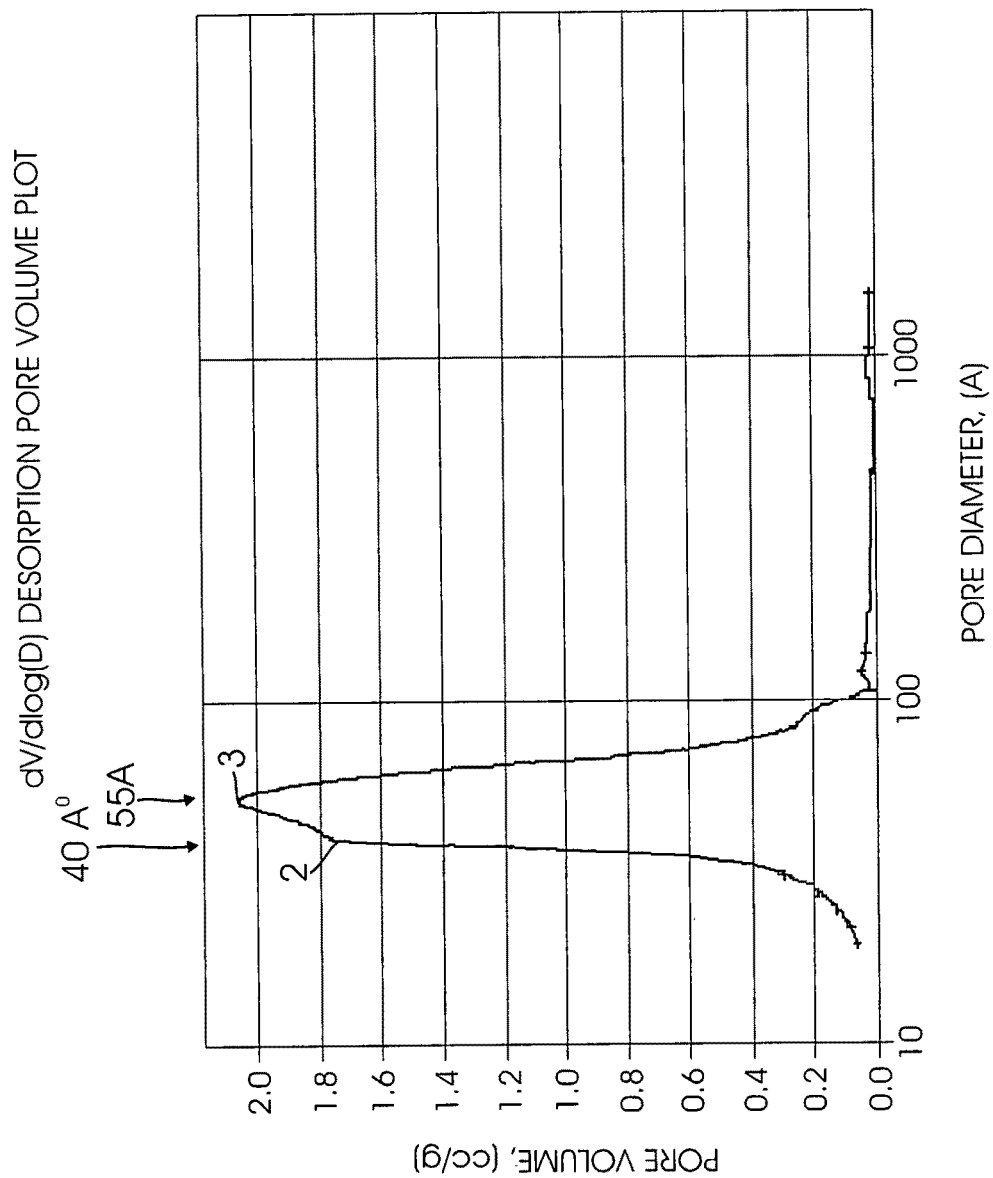
FIG. 3 is a graph containing a curve to illustrate a desorption pore volume versus the pore diameter of the mesopores from the example of the substrate of materials of the present invention.

As a contrast to Example 1, a broad peak having two maxima is observed, which is illustrated in FIG. 3. The first maxima 2 is at about 40 angstrom and the second maxima 3 is at approximately 55 angstrom, where an average pore size diameter is about 69 angstrom in diameter. Comparing the peak position of 40 angstrom in FIG. 2, it will be appreciated that the maxima at 40 angstrom may be the result of the surfactant P123, which was experimentally added into the sol.

It will be appreciated that, although the above disclosure applies the substrate of ceramic materials as the example, the present invention also can apply non-ceramic materials as the substrates. For example, polymeric materials are also appropriate for the present invention.

Defined in detail, the present invention is a mesoporous monolithic substrate of ceramic 2 materials, consisting of: (a) a multiplicity of opened channels of one dimensional macropore having a mesoporous inner surface; (b) each of the opened channels is isolated from each other; and (c) each of the opened channels is aligned with each other and are further aligned with the substrate of the ceramic materials.

Defined more broadly, the present invention is a mesoporous monolithic substrate of materials, consisting of a multiplicity of opened channels of one dimensional macropore having a mesoporous inner surface.

Defined in detail, the present invention is a method for producing a mesoporous monolithic substrate of ceramic materials containing a metal constituent, consisting of the following steps: (a) providing a metal compound containing non metallic constituents and a metal constituent which is a precursor of the metal constituent of the ceramic materials; (b) hydrolyzing the metal compound to be a sot (c) modifying the sol by mixing the sol with a matrix pore modifier to form a modified sol; (d) preparing a model of the monolithic substrate of materials comprising a hollow housing having a first and second end, wherein the housing has a removable first and second stop for sealing the respective first and second end of the housing, and the inside of the housing contains a multiplicity of micro fibers which are aligned with a longitudinal dimension of the housing; (e) casting the modified sol into the model of the monolithic substrate of materials to form a cast modified sol, wherein the cast modified sol surrounds each of the microfibers; (f) gelling the cast modified sol inside of the model to form a gel; (g) aging the gel to be a syneresical gel; (h) drying the syneresical gel to be a monolithic substrate of a dried and solidified gel which inside contains the multiple micro fibers; (i) removing the monolithic substrate of the dried and solidified gel from the housing wherein the dried and solidified gel surrounds each of the multiple micro fibers; and (j) forming a monolithic substrate of ceramic materials containing a multiplicity of opened channels of one dimensional pore having a mesoporous inner surface by heating the monolithic substrate of materials containing the dried and solidified gel to eliminate the micro fibers positioned inside of the dried and solidified gel.

Also defined in detail, the present invention is a method for producing a mesoporous monolithic substrate of ceramic materials containing a metal constituent, consisting of the following steps: (a) providing a metal compound containing a metal constituent which is a precursor of the metal constituent of the materials, and non metallic constituents; (b) hydrolyzing the metal compound to be a sol; (c) preparing a model of the monolithic substrate of material comprising a hollow housing having a first and second end, wherein the housing has a removable first and second stop for sealing the respective first and second end of the housing, and the inside of the housing contains a multiplicity of micro fibers which are aligned with a longitudinal dimension of the housing; (d) casting the sol into the model of the monolithic substrate of materials to form a cast modified sol, wherein the cast modified sol surrounds each of the microfibers; (e) gelling the cast modified sol inside of the model to form a wet gel having a solvent; (f) exchanging the solvent of the wet gel with a solution having a basic pH; (g) aging the gel to be a syneresical gel; (h) drying the syneresical gel to be a monolithic substrate of a dried and solidified gel which inside contains the multiple micro fibers; (i) removing the monolithic substrate of the dried and solidified gel from the housing, wherein the dried and solidified gel surrounds each of the multiple micro fibers from the housing; and (j) forming a monolithic substrate of ceramic materials containing a multiplicity of opened channels of one dimensional pore having a mesoporous inner surface by heating the monolithic substrate of materials containing the dried and solidified gel to eliminate the micro fibers positioned inside of the dried and solidified gel.

Defined alternatively in detail, the present invention is a method for producing a mesoporous monolithic substrate of ceramic materials containing multiple opened channels of one dimensional macropore having a mesoporous inner surface applying sol-gel techniques having a sol, further consisting of the following steps: (a) preparing a model of the monolithic substrate of materials comprising providing a hollow housing of a model having a first and second end; providing a removable first and second stop for sealing the respective first and second end of the housing; providing a multiplicity of micro fibers which are aligned with a longitudinal dimension of the housing; (b) casting the sol into the model for the monolithic substrate of materials, wherein the inside of the cast sol contains the multiple macrofibers; and (c) forming a monolithic substrate of ceramic materials containing a multiplicity of opened channels of one dimensional pore having a mesoporous inner surface by heating the monolithic substrate of materials containing the dried and solidified gel to eliminate the micro fibers positioned inside of the dried and solidified gel.

Of course the present invention is not intended to be restricted to any particular form or arrangement, or any specific embodiment, or any specific use, disclosed herein, since the same may be modified in various particulars or relations without departing from the spirit or scope of the claimed invention hereinabove shown and described of which the apparatus or method shown is intended only for illustration and disclosure of an operative embodiment and not to show all of the various forms or modifications in which this invention might be embodied or operated.

What is claimed is:

1. A method for producing a mesoporous monolithic substrate of ceramic materials containing a metal constituent, comprising the following steps:
   a. providing a metal compound containing non metallic constituents and a metal constituent which is a precursor of the metal constituent of the ceramic materials;
   b. hydrolyzing the metal compound to be a sol;
   c. modifying the sol by mixing the sol with a matrix pore modifier to form a modified sol;
   d. preparing a model of the monolithic substrate of materials comprising a hollow housing having a first and second end, wherein the housing has a removable first and second stop for sealing the respective first and second end of the housing, and the inside of the housing contains a multiplicity of micro fibers which are aligned in a given direction within the housing;
   e. casting the modified sol into the model of the monolithic substrate of materials to form a cast modified sol, wherein the cast modified sol surrounds each of the microfibers;
   f. gelling the cast modified sol inside of the model to form a gel;
   g. aging the gel to be a syneresical gel;
   h. drying the syneresical gel to be a monolithic substrate of a dried and solidified gel which inside contains the multiple micro fibers;
   i. removing the monolithic substrate of the dried and solidified gel from the housing wherein the dried and solidified gel surrounds each of the multiple micro fibers; and
   j. forming a monolithic substrate of ceramic materials containing a multiplicity of open channels which are isolated from each other, have roughly the same size, and are all aligned in the same given direction, each of the multiplicity of open channels having a mesoporous inner surface, the open channels are formed by heating the monolithic substrate of materials containing the dried and solidified gel to eliminate the micro fibers positioned inside of the dried and solidified gel.

2. The method in accordance with claim 1, wherein said non metallic constituents of said metal compound include organic constituents.

3. The method in accordance with claim 2, wherein said organic constituents of said metal compound further comprising at least one hydrolyzable group.

4. The method in accordance with claim 2, wherein said organic constituents of said metal compound of further comprising at least one non hydrolyzable group.

5. The method in accordance with claim 1, wherein said metal constituent of said metal compound is selected from a group consisting of carbon and silicon.

6. The method in accordance with claim 1, wherein said metal compound is further comprised of a mixture of metal compounds.

7. The method in accordance with claim 6, wherein said metal compounds from the mixture further comprising metal constituents having a same metal element.

8. The method in accordance with claim 6, wherein each of said metal compounds from the mixture consists of different non-metallic constituents.

9. The method in accordance with claim 8, wherein said different non-metallic constituents of said each metal compound further comprising organic constituents.

10. The method in accordance with claim 9, wherein said organic constituent of said different non-metallic constituents of said each metal compound further comprising at least one hydrolyzable group.

11. The method in accordance with claim 9, wherein said organic constituent of said different non-metallic constituents of said each metal compound further comprising non-hydrolyzable groups.

12. The method in accordance with claim 1, wherein said matrix pore modifier is further comprised of at least one surfactant.

13. The method in accordance with claim 1, wherein said matrix pore modifier is further comprised of at least one solution capable of having a basic pH.

14. The method in accordance with claim 1, wherein said matrix pore modifier is further comprised of at least one surfactant and at least one solution capable of having a basic pH.

15. The method in accordance with claim 12, wherein said surfactant is selected from a group consisting of triblock copolymers such as poly (ethylene oxide)-b-poly (propylene oxide)-b-poly (ethylene oxide), cetyltrimethyl ammonium bromide, hexadecyltrimethyl ammonium chloride, butadiene-b-ethylene oxide, organic chemicals containing amido group or alkylamido group, organic chemicals containing amide group including N-methylormamide, N,N-dimethylformamide, actamide and N-mettylacetamide, pyridine and imidazol.

16. The method in accordance with claim 13, wherein said solution capable of having a basic pH is made from materials including urea.

17. The method in accordance with claim 1, wherein said micro fibers are organic.

18. The method in accordance with claim 1, wherein said micro fibers are inorganic.

19. The method in accordance with claim 1, wherein at step j an additional treatment is needed to remove said micro fibers which are inorganic.

20. The method in accordance with claim 19, wherein said additional treatment includes a chemical treatment.

21. A method for producing a mesoporous monolithic substrate of ceramic materials containing a metal constituent, comprising the following steps:
   a. providing a metal compound containing a metal constituent which is a precursor of the metal constituent of the materials, and non metallic constituents;
   b. hydrolyzing the metal compound to be a sol;
   c. preparing a model of the monolithic substrate of material comprising a hollow housing having a first and second end, wherein the housing has a removable first and second stop for sealing the respective first and second end of the housing, and the inside of the housing contains a multiplicity of micro fibers which are aligned in a given direction within the housing;
   d. casting the sol into the model of the monolithic substrate of materials to form a cast modified sol, wherein the cast modified sol surrounds each of the microfibers;
   e. gelling the cast modified sol inside of the model to form a wet gel having a solvent;
   f. exchanging the solvent of the wet gel with a solution having a basic pH;
   g. aging the gel to be a syneresical gel;
   h. drying the syneresical gel to be a monolithic substrate of a dried and solidified gel which inside contains the multiple micro fibers;
   i. removing the monolithic substrate of the dried and solidified gel from the housing, wherein the dried and solidified gel surrounds each of the multiple micro fibers from the housing; and
   j. forming a monolithic substrate of ceramic materials containing a multiplicity of open channels which are isolated from each other, have roughly the same size, and are all aligned in the same given direction, each of the multiplicity of open channels having a mesoporous inner surface, the open channels are formed by heating the monolithic substrate of materials containing the dried and solidified gel to eliminate the micro fibers positioned inside of the dried and solidified gel.

22. The method in accordance with claim 21, wherein at step f said solution having the basic pH is made of including urea.

23. The method in accordance with claim 21, wherein said micro fibers are organic.

24. The method in accordance with claim 21, wherein said micro fibers are inorganic.

25. The method in accordance with claim 21, wherein at step j an additional treatment is needed to remove said micro fibers which are inorganic.

26. The method in accordance with claim 25, wherein said additional treatment includes a chemical treatment.

27. A method for producing a mesoporous monolithic substrate of ceramic materials containing multiple opened channels of one dimensional macropore having a mesoporous inner surface applying sol-gel techniques having a sol, further comprising the following steps:
   a. preparing a model of the monolithic substrate of materials comprising providing a hollow housing of a model having a first and second end; providing a removable first and second stop for sealing the respective first and second end of the housing; providing a multiplicity of micro fibers which are aligned in a given direction of the housing;
   b. casting the sol into the model for the monolithic substrate of materials, wherein the inside of the cast sol contains the multiple macrofibers; and
   c. forming a monolithic substrate of ceramic materials containing a multiplicity of open channels which are isolated from each other, have roughly the same size, and are all aligned in the same given direction, each of the multiplicity of open channels having a mesoporous inner surface, the open channels are formed by heating the monolithic substrate of materials containing the dried and solidified gel to eliminate the micro fibers positioned inside of the dried and solidified gel.

28. The method in accordance with claim 27, wherein said micro fibers are organic.

29. The method in accordance with claim 27, wherein said micro fibers are inorganic.

30. The method in accordance with claim 27, wherein an additional treatment is needed to remove said micro fibers which are inorganic.

31. The method in accordance with claim 30, wherein said additional treatment includes a chemical treatment.

32. The method in accordance with claim 21, wherein said micro fibers are arranged orderly.

* * * * *